United States Patent [19]
Morris

[11] 3,809,032
[45] May 7, 1974

[54] INTERNAL COMBUSTION ENGINE MANIFOLD

[75] Inventor: George O. Morris, Newport Beach, Calif.

[73] Assignee: Fred C. Offenhauser, Newport Beach, Calif.; a part interest

[22] Filed: Aug. 3, 1972

[21] Appl. No.: 277,641

Related U.S. Application Data

[63] Continuation of Ser. No. 73,010, Sept. 17, 1970.

[52] U.S. Cl............ 123/52 M, 123/52 MV, 123/127
[51] Int. Cl....F02b 75/22, F02b 75/20, F02m 11/00
[58] Field of Search...... 123/52 MV, 52 MY, 52 M, 123/127, 188 M

[56] References Cited
UNITED STATES PATENTS

| | | | |
|---|---|---|---|
| 3,171,395 | 3/1965 | Bartholomew | 123/127 |
| 3,282,261 | 11/1966 | Bartholomew | 123/52 M |
| 3,512,508 | 5/1970 | Winkler | 123/127 |
| 3,678,905 | 7/1972 | Diehl | 123/52 MV |
| 2,804,862 | 9/1957 | Nedwidek | 123/188 M |

Primary Examiner—Wendell E. Burns
Attorney, Agent, or Firm—Donald D. Mon

[57] ABSTRACT

An internal combustion engine manifold adapted to mount a multiple-barrel carburetor to an engine, the carburetor having a primary barrel for supplying fuel-air mixture at lower speeds and a supplemental secondary barrel to supply supplemental fuel-air mixture at higher speeds. The manifold connects respective primary and secondary inlet ports to a respective cylinder intake port by means of separate axially-extending primary and secondary plenum chambers from which respective laterally-extending primary and secondary passages extend in pairs to respective cylinder inlet ports, the primary and secondary passages which discharge into a respective cylinder inlet port doing so in adjacency and in substantial parallelism. The plenum chambers may have a flat bottom surface against which the fuel-air mixture from the inlet port discharges substantially perpendicularly.

7 Claims, 5 Drawing Figures

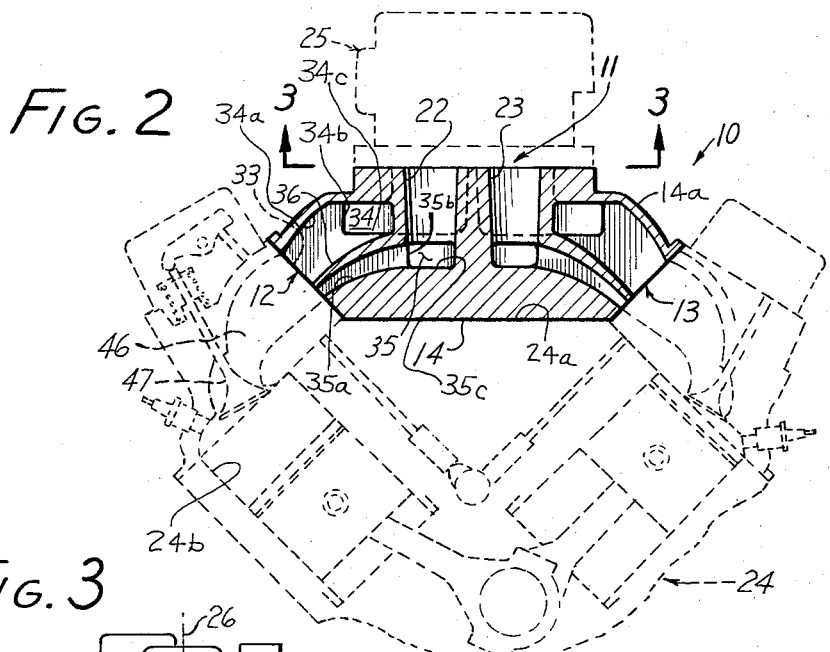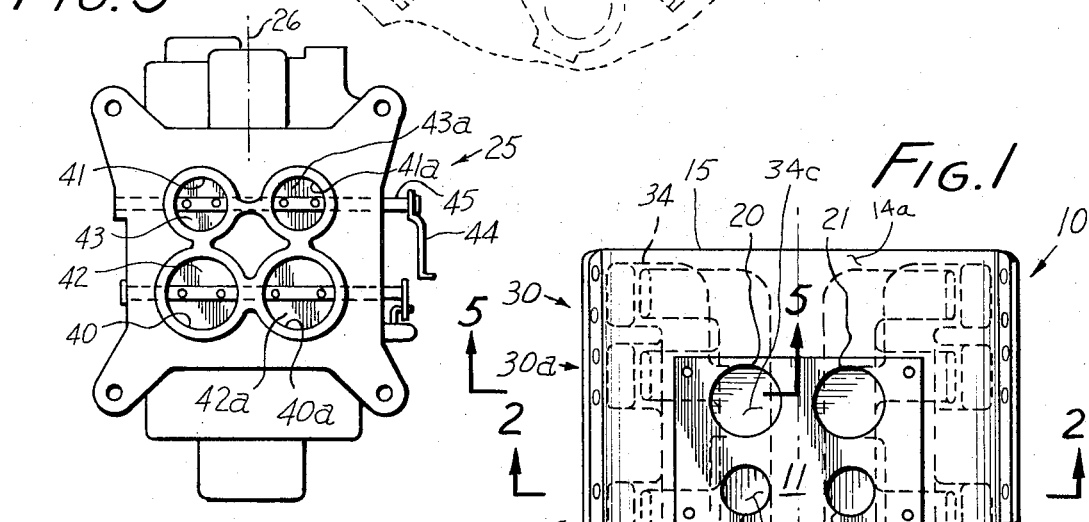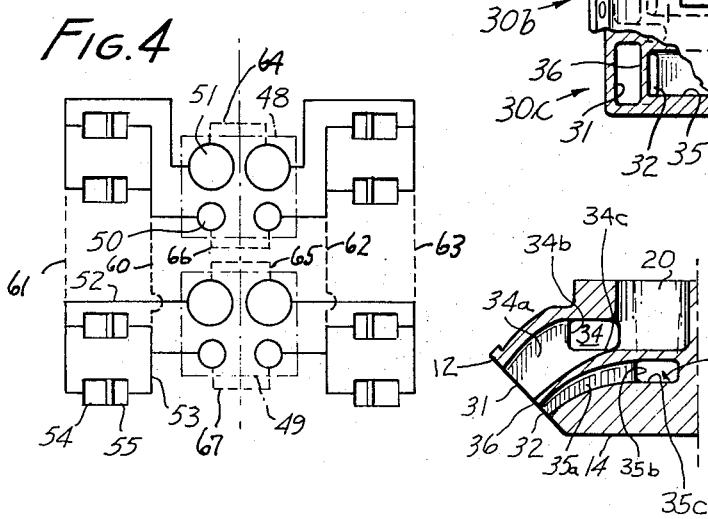

INTERNAL COMBUSTION ENGINE MANIFOLD

CROSS-REFERENCE TO OTHER PATENT APPLICATION

This patent application is a continuation of applicant's presently co-pending U.S. Pat. application Ser. No. 73,010, filed Sept. 17, 1970, entitled "Internal Combustion Engine Manifold," which will be abandoned after the filing of the instant patent application.

This invention relates to internal combustion engines and more particularly toward manifolding means for adapting multiple-barreled carburetors thereto.

In modern engine design, the required rpm ranges and horsepower ranges are complex, varied, and interrelated. The requirements imposed on intake manifolds in order to fulfill the demands of the engine are difficult to accomplish because of the varying volumes of air required by the engine at various speeds and horsepower outputs. The volumetric efficiency of the air flow is directly proportional to the size and length of the passages of the intake manifold, and these affect throttle response, engine combustion efficiency, air-fuel ratios, smog emission, and total horsepower output. At low engine speeds, small passages and small carburetor bore sizes are necessary in order to obtain the air velocity and the directional stability needed. These are required for, among other purposes, to maintain the suspension of the atomized fuel in the air stream. However, at higher rpm ranges the smaller ports in carburetors very quickly restrict the total required air flow to the engine and impose a ceiling limitation. At these higher ranges, larger ports and carburetor sizes are needed to efficiently supply the engine. However, such ports and sizes create very unstable air flow patterns at lower rpms and create static air pressure differentials that tend not only to interrupt the directional stability but actually permit the fuel to drop out of suspension and condense into its raw state, thereby creating an unbalanced condition in the air-fuel ratios.

Carburetor designs have been made to combat the foregoing undesirable conditions by using either multiple-barrel designs with a smaller primary barrel and a larger secondary barrel, or by the use of standard four-barrel carburetors with nearly equal bore sizes on the primary and secondary supplies. In both cases, a progressive arrangement is utilized such that at low and moderate throttle ranges, such as up to about two-thirds of capacity, the carburetor supplies the engine solely from its primary fuel section. The secondary section comes into operation only after approximately two-thirds of the throttle opening of the primary section has been reached. This arrangement works reasonably well, and is in wide-spread use. When the butterfly valves are opened reasonably smoothly and the port sizes are not too large, and when the cam timing does not have too much overlap between intake and exhaust cycles, this is quite a satisfactory arrangement. However, recent engineering developments have proven that a fairly small engine will put out more horsepower with more efficiency provided the cam overlap is increased and port sizes are made larger to allow for the increased requisite air flow. While this increases engine efficiency at middle and high throttle conditions, it produces the opposite effect at lower rpm ranges because of the previously stated effects on air flow velocities.

It is an object of this invention to provide a manifold which not only divides the primary and secondary flows on their way to the cylinders so that the flow in each is stable, but joins them in such a manner that the relatively slower secondary flow is boosted and stabilized by the primary air flow when it reaches the cylinder intake port. It is another object of this invention to supply the fuel-air mixture to the cylinder inlet ports from plenum chambers that are connected to the inlet port from the carburetor. The mixture is drawn from the plenum chambers through lateral passages.

This invention is accomplished by providing separate inlet ports to receive the secondary and primary outputs of the carburetor and to convey them separately to respective ones of the intake valves. The streams are admitted to the intake in adjacency to each other, whereby a boosting and stabilizing effect is given to the relatively slower moving secondary mixture by the relatively faster moving primary mixture whereby both will be stable and fully mixed.

According to a feature of this invention, a primary plenum chamber and a secondary plenum chamber respectively receive fuel-air mixture from the primary and secondary carburetor barrels, and fuel-air mixture is discharged from the plenum chambers to the cylinder inlet ports through respective sets of lateral primary and secondary passages.

According to a preferred but optional feature of the invention, the plenum chambers have a substantially flat bottom surface against which the fuel-air mixture discharges perpendicularly.

The above and other features of this invention will be fully understood from the following detailed description and the accompanying drawings, in which:

FIG. 1 is a plan view of a manifold according to the invention, partially broken away to show some of its internal construction;

FIG. 2 is a section view taken along line 2—2 of FIG. 1 showing an adaptation of the manifold to a carburetor and to a V-type engine which are shown in phantom outline;

FIG. 3 is a bottom plan view taken along line 3—3 of FIG. 2;

FIG. 4 is a schematic diagram of another arrangement incorporating the invention; and FIG. 5 is a half-section taken at lines 5—5 of FIG. 1.

The presently preferred manifold 10 according to this invention in its preferred embodiment is an integral structure, preferably a metallic body comprising a metal casting having a flat carburetor mounting face 11 and two flat adapter mounting faces 12, 13 angularly disposed to one another and a bottom 14. A second side surface 14a is exposed to the air in heat-transfer relationship therewith. The ends 15, 16 are shown flat but may be of any desired contour. Other embodiments of this invention may be of different contour to suit a particular installation without departing from the invention. The illustrated embodiment is for a V-8 engine.

The manifold shown is for a single four-barrel carburetor, and includes four inlet ports 20, 21, 22, 23, in the mounting face 11. Their pattern is such that they will match up and register with any standard four-barrel carburetor 25 such as shown in FIG. 3. The carburetor is mounted to mounting face 11.

Referring to FIG. 2, it will be seen that the manifold 10 is shown adapted and mounted to a V-type internal combustion engine 24, shown in phantom line and to a carburetor 25, also shown in phantom line. The engine has an outer surface 24a and a plurality of cylinders 24b. Surface 24a is heated as a consequence of the engine's operation. The embodiment shown is symmetrical about its center line 26. Therefore, only one side will be described in detail hereinafter, the other being its mirror image.

Adapter mounting face 12 bears four sets 30, 30a, 30b, 30c, of divided ports. The larger secondary opening 31 (FIG. 5) of each set is adjacent to the smaller primary opening 32 of the respective set, which is typical for each set of ports. Each of said sets of ports registers with a corresponding intake port 33 (FIG. 2) of a respective cylinder so that there is one set of ports (one primary and one secondary) for each cylinder. All secondary openings 31 are in communication with secondary inlet port 20 by way of secondary plenum chamber 34, which extends axially in the manifold, and a respective laterally-extending secondary passage 34a, there being a passage 34a for each opening 31 connecting it to the wall 34b of the plenum chamber. All primary openings 32 are in communication with primary inlet port 22 by way of a primary plenum chamber 35, which extends axially in the manifold, and a respective laterally-extending primary passage 35a, there being a passage 35a for each opening 32 connecting it to the wall 35b of the plenum chamber 35. The plenum chambers have a substantial dimension of length (axially aligned with the cylinders in the illustration), from which plenum chambers the passages depart at substantially right angles relative to the said dimension (sometimes referred to as "laterally relative to that dimension"). Both passages 34a and 35a taper down to a smaller cross-section as they extend from face 11 to face 12. They are isolated from each other by wall 36 throughout their entire length and discharge in adjacency and substantial parallelism. The walls 34b and 35b of the plenum chambers 35 and 35, respectively, include a substantially flat bottom surface 34c and 35c, respectively, against which fuel-air mixture from the carburetor discharges substantially perpendicularly.

FIG. 3 shows a bottom view of a typical 4-barrel carburetor 25. It includes two large secondary discharge ports 40, 40a and two smaller primary discharge ports 41, 41a with their corresponding secondary butterfly valves 42, 42a, and primary valves 43, 43a, respectively.

In operation the smaller primary valves 43, 43a are simultaneously opened by control arm 44 attached to shaft 45 which carries the butterfly valves 43, 43a thus allowing air passage from the carburetor fuel system to the manifold passages on both sides of the engine. The carburetor is symmetrical about centerline 26. Therefore, the one side will be described which corresponds to the manifold side described. The other side functions simultaneously and identically.

The air admitted by the opening of primary valve 43 draws in the fuel mixture from the primary barrel carburetor, passes through port 22 all of the ports which are supplied by it) impinges on surface 35c and flows from the primary plenum chamber into and through any of its respective laterally-extending primary passages 35a in which the cylinder valve is open (increasing in velocity as the cross-section decreases), and then into the intake chamber 46 of the respective cylinders, and thence through the intake valves 47 to the combustion chamber of the engine. When the valve 43 is approximately two-thirds open, the secondary valve 42 is automatically opened by linkage not shown, thus allowing a greater volume of air to enter the system drawing fuel mixture with it from the secondary barrel through port 20 and into secondary plenum chamber 34, where it impinges substantially perpendicularly onto bottom surface 34c and flows into whichever ones of the laterally-extending secondary passages 34a is open to flow at the time, increasing in speed to the larger opening 31 where it is boosted by the air stream already passing through opening 32 there combining with it to enter the engine.

In FIG. 4, there is shown an arrangement utilizing two four-barrel carburetors 48, 49 on a V-8 engine where valve 50 corresponds with valve 43 of FIG. 3, valve 51 with valve 42, secondary plenum chamber 52 with secondary plenum chamber 34, primary plenum chamber 53 with primary plenum chamber 35, opening 54 with 31, opening 55 with 32. In this arrangement, two carburetors instead of one are used, each barrel supplying only two instead of four cylinders. Obviously this can be extended such that each barrel supplies but one by providing more carburetors.

Many variations of arrangements are possible, such as using various numbers of two-barrel carburetors or four-barrel carburetors on 2, 4, 6, 8, 12, or 16 cylinder engines without limiting the adaptation of this invention. The first side surface 14 conducts heat from the engine to heat the fuel-air mixture in the primary plenum chamber. Surface 14a, which is in fluid-transfer relationship with surrounding air, removes heat from the fuel-air mixture in the secondary plenum chamber. The primary plenum chamber is heated by heat conducted from the entine by the metallic body of the manifold, and, of course, the heat removed by heat transfer with the air is similarly conducted, but at the opposite side.

The theory of the foregoing device will be evident from the previous description. When the engine is started in operation and operates at rpms requiring less than about two-thirds throttle opening, the supply of fuel-air mixture is derived entirely from the primary barrels and is distributed solely through the primary passageways to the respective ones of the cylinder inlets. When higher performance is required and the valves open in the secondary barrels a relatively more sluggish flow passes through the secondary passageways, finally to be discharged therefrom at the terminal ends at the entrance to the cylinder inlet ports. Until they reach the engine these passageways will be divided one from another, and their velocities will have been boosted by the diminishing cross-section area of the respective passageways.

As the streams discharge side by side, a "fluistic" effect is obtained, namely the intermingling of the two parallel streams, the energy of the secondary stream receiving a forward boost from that of the primary stream whereby it is both increased in velocity and given directional stability thereby tending to maintain the entire mixture of the primary and secondary output in complete and uniform suspension and preventing the dropping out of raw fuel, and of turbulence which might occur at lower velocities. It will be noted that the rapidly moving discharge from the primary will create a low pressure area in the secondary even before the secondary valves open, so that when they do, the flow through the secondary will instantly be boosted.

This invention thereby provides a simple manifold which greatly increases the horsepower output of a specific carburetor. It will be found that there are not sluggish or flat spots in the operation of the device and that this manifold is completely adaptable to engines of all classes. It will be noted that by increasing the air speed as the fuel-air mixture is largely moving at a relatively high rate, it does so only because it is moving from the high pressure area of atmosphere to a lower pressure area, the vacuum within the manifold. If the carburetor valves were opened suddenly or very quickly, the pressure differential within the manifold will neutralize and momentarily the air flow will stop and also the fuel supply will stop because the carburetor fuel feed system is dependent on air flow to meter the fuel to the engine. In this case, a flat spot or a "bog" results. In large port engines the fuel feed system is critical and good fuel atomization is difficult to achieve. This is overcome in the present invention because the smaller port size of the primary section's being connected to only the primary section of the carburetor increases the velocity at which this air flows at the same time that the secondary section is at a static condition. When the carburetor's secondary plates are opened suddenly, the air is already flowing through the primary section and the aforesaid lower pressure region is created. As it discharges into the manifold, it gives the aforesaid fluistic booster effect to the secondary section when it is opened, as well as stabilizing the air flow and lending direction stability thereto. The total cross-section area of both the primary and secondary systems will supply sufficient volume to operate the engine at peak power demands. As the rpm increases, the velocity through the carburetor is sufficient properly to atomize the fuel for more complete combustion. This booster effect is produced by the air flowing from the smaller primary port into the lower area and drawing with it air flow from the secondary port thereby increasing the total flow of both sections.

It has been found in operation tha this manifold is capable of improving the operation of a standard multiple-barrel carburetor by as much as 25 percent, while still remaining simple to to manufacture and install. In addition to being an adapter it may also be utilized as part of the basic engine as originally constructed.

In the manifolding of carburetors, it is often best practice to interconnect certain passages. This practice is called "ballasting," and permits pulsating flow between various segments of the system. This significantly smooths out engine operation. The primary and secondary plenum chamber are formed in sets of one pair per set of primary and secondary barrels. These plenum chambers may supply the cylinders through passages such as passages 34a and 35a (forming parts of sets 30, 30a, 30b and 30c), and this arrangement is shown in FIGS. 1 and 4.

When more than one set of plenum chamber is used, it is common to ballast them, especially, but not necessarily only, when more than one set is used on the same bank of cylinders. Thus in FIG. 4, ballast passage 60 is shown connecting two primary plenum chambers of different sets. Often only the primary system is ballasted, but sometimes one of the secondary systems is, or both may be. In FIG. 4, ballast passage 61 is shown interconnecting two secondary plenum chambers of different sets. These are on the same bank of cylinders.

Ballast passages 62 and 63 respectively connect primary and secondary pleunum chambers on the other bank.

Interbank ballasting may be effected by ballast passages 64 or 65 (for the secondaries) and 66 and 67 (for the primaries).

The division between the primary and secondary flow systems is shown as terminating at the end of the cylinder inlet port, and this will be a common construction. However, the separation may be continued further into the port, and the divider may end well inside it, instead of at its end. It is even possible to provide an extension as part of the cylinder head if preferred. The location of the confluence of the two streams is therefore not limited to the outlet end of the cylinder port, but may be extended into it, or even brought back into the manifold block itself should, for some reason, enlargement or lengthening of the cylinder inlet port be desired. The term "cylinder inlet port" includes not only the aperture at its end, but also the passage leading to the inlet valve.

This invention is not to be limited by the embodiments shown in the drawings and described in the description which are given by way of example and not of limitation, but only in accordance with the scope of the appended claims.

I claim:

1. An internal combustion engine manifold for mounting a carburetor to an engine, said engine having an outer surface and a plurality of cylinders and respective cylinder inlet ports, said carburetor being of the type having a primary barrel which is open at all speeds and a secondary barrel which is open only at higher speeds or under heavy load or both, said manifold comprising: a metallic body adapted to be mounted to the engine, and having a first side surface adapted to be mounted facing the said outer surface of the engine so as to receive heat therefrom, and a second side surface remote therefrom and adapted to be exposed to the air in heat-transfer relationship therewith, the body having an internal primary plenum chamber and an internal secondary plenum chamber, each of said plenum chambers opening onto the outside of the body at a respective inlet port which is aligned with a respective barrel of the carburetor, the primary plenum chamber lying adjacent to the first side surface and closer thereto than the secondary plenum chamber, and the secondary plenum chamber lying adjacent to the said second side surface and closer thereto than the primary plenum chamber, whereby the primary plenum chamber will be heated by heat received from the engine at the first side surface, and the secondary plenum chamber will be cooled by heat transfer to the air which contacts said second side surface, each of said plenum chambers being adapted to supply a plurality of cylinders at a plurality of cylinder inlet ports, each of said plenum chambers having a substantial dimension of length and being bounded, at least in part, by a wall which extends through the body to a location of adjacency to each of the cylinder inlet ports, and a laterally-extending primary passage and a laterally-extending secondary passage in said body extending laterally relative to the dimension of length between the said wall of the respective primary plenum chamber and the wall of the secondary plenum chamber and an opening aligned with a respective cylinder inlet port, all of said passages being separate from one another, and departing laterally from the respective plenum chamber substantially at right angles thereto, and the primary and secondary passages which discharge into a respective cylinder inlet port doing so in adjacency and in substantial parallelism.

2. A manifold according to claim 1 in which each of the plenum chambers has a substantially flat bottom surface, and in which the barrels discharge their output normally against the respective said bottom surface.

3. A manifold according to claim 1 in which there are at least four pairs of said primary passages and secondary passages to supply at least four engine cylinders.

4. A manifold according to claim 3 in which each of the plenum chambers has a substantially flat bottom surface, and in which the barrels discharge their output normally against the respective said bottom surface.

5. A manifold according to claim 1 in which all of said laterally extending passages decrease in cross-section area as they extend away from the respective plenum chamber to the respective opening.

6. A manifold according to claim 5 in which each of the plenum chambers has a substantially flat bottom surface, and in which the barrels discharge their output normally against the respective bottom surface.

7. A manifold according to claim 6 in which there are at least four pairs of said primary passages and secondary passages to supply at least four engine cylinders.

* * * * *

UNITED STATES PATENT OFFICE
CERTIFICATE OF CORRECTION

PATENT NO. : 3,809,032
DATED : May 7, 1974
INVENTOR(S) : GEORGE O. MORRIS

It is certified that error appears in the above-identified patent and that said Letters Patent are hereby corrected as shown below:

Col. 1, line 11, after "engines" insert a comma
Col. 1, line 35, change "to efficiently" to --efficiently to--
Col. 2, line 15, after "valves" change the comma to a period
Col. 2, line 54, between "14" and the period insert --(Sometimes called a "first side surface")
Col. 3, line 41, change "35", first occurrence, to --34--
Col. 3, line 62, change "travels through...port 33" to --enters primary plenum chamber 35 (in which it is available to all of the ports which are supplied by it) impinges on surface 35c and flows from the primary plenum chamber into and through any of its respective laterally-extending primary passages 35a in which the cylinder valve is open (increasing in velocity as the cross-section decreases), and then--
Col. 4, line 37, "entine" should read --engine--
Col. 5, line 43, "tha" should read --that--
Col. 5, line 46, cancel "to", first occurrence
Col. 5, line 54 "chamber" should read --chambers--
Col. 5, line 61, "chamber" should read --chambers--
Col. 6, line 8, "64 or 65" should read --64 and 65--

Signed and Sealed this sixteenth Day of March 1976

[SEAL]

Attest:

RUTH C. MASON
Attesting Officer

C. MARSHALL DANN
Commissioner of Patents and Trademarks